United States Patent [19]

Fling

[11] 4,437,674
[45] * Mar. 20, 1984

[54] FLUID SEALING DEVICES

[75] Inventor: George K. Fling, Dallas, Tex.

[73] Assignee: Vought Corporation, Dallas, Tex.

[*] Notice: The portion of the term of this patent subsequent to Apr. 19, 1990 has been disclaimed.

[21] Appl. No.: 414,700

[22] Filed: Sep. 3, 1982

Related U.S. Application Data

[62] Division of Ser. No. 189,548, Sep. 22, 1980, Pat. No. 4,380,342.

[51] Int. Cl.³ .............................................. F16J 15/09
[52] U.S. Cl. .................................. 277/188 A; 277/177
[58] Field of Search ............... 277/188 R, 188 A, 176, 277/177, 190, 191, 165

[56] References Cited

U.S. PATENT DOCUMENTS

| | | | |
|---|---|---|---|
| 2,973,978 | 3/1961 | Oppenheim | 277/188 A |
| 3,765,690 | 10/1973 | Sievenpiper | 277/177 |
| 3,817,517 | 6/1974 | Lundquist | 277/176 |
| 4,143,586 | 3/1979 | Zittine | 277/188 A |
| 4,380,342 | 4/1983 | Fling | 277/188 A |

*Primary Examiner*—Robert I. Smith
*Attorney, Agent, or Firm*—James M. Cate; Stephen S. Sadacca

[57] ABSTRACT

Disclosed is a sealing arrangement comprising two rings which preferably are complementary right trapezoids in cross-section. One ring is an elastomeric sealing ring. The other ring is a semi-rigid non-elastomeric back-up ring which is more rigid than the sealing ring. The rings are carried in a groove in one mating face of two members with mating faces which are movable with respect to each other. The sealing ring is arranged with the face represented by the shorter base of the trapezoid adjacent the member movable with respect to the member carrying the sealing ring and the back-up ring is arranged with the face thereof represented by the longer base of the trapezoid coplanar with the shorter base of the sealing ring. The elastomeric sealing ring is oriented so that it is nearer the area of higher fluid pressure. Thus any increase in pressure tends to wedge the sealing ring against the face of the back-up ring represented by the longer leg of the trapezoid so that extrusion of the elastomeric sealing ring and gross distortion of the elastomeric sealing ring are avoided.

6 Claims, 1 Drawing Figure

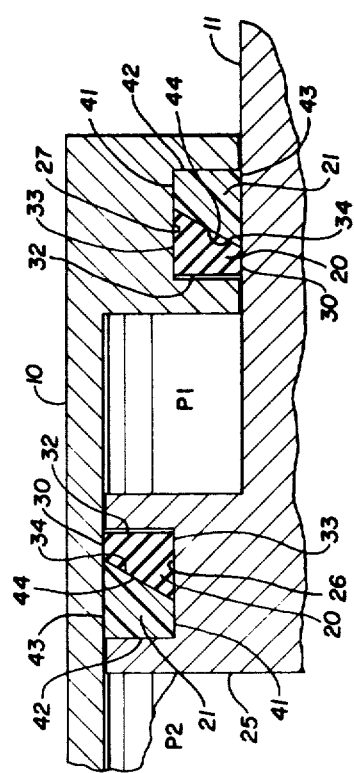

FLUID SEALING DEVICES

This is a division of application Ser. No. 06/189,548 filed Sept. 22, 1980, now U.S. Pat. No. 4,380,342.

DESCRIPTION

Technical Field

This invention relates to fluid sealing devices and assemblies. More particularly, it relates to apparatus for forming a fluid seal between parallel mating surfaces of first and second members, one of which members is movable with respect to the other and separates a first area containing fluid at a first pressure and a second area containing fluid at a second, lower pressure, such as pistons and rods in piston and cylinder assemblies and the like, and to fluid powered actuators employing such fluid sealing apparatus.

In all fluid systems wherein a member separating two fluids at different pressures is movable with respect to another member, such as in piston and cylinder assemblies and the like, it is necessary to form a seal between the two members which seal maintains fluid separation between fluids of differing pressure levels but permits the two members to be movable with respect to each other. Where relatively low pressure differentials are involved, rather simple sealing devices such as O-rings and the like may be satisfactorily employed. However, as the environment of the sealing arrangement changes, more complicated sealing arrangements are required. In pneumatic and hydraulic systems used in high performance aircraft, missiles, etc., the sealing apparatus is often subjected to harsh environments, such as high temperatures, rapid temperature changes, extremely high pressure differentials and the like. Design considerations such as weight, cost, reliability and lifetime become critical and place much higher demands on the sealing assemblies. Accordingly, more complex sealing arrangements have been devised in attempts to meet these critical requirements.

Characteristically, fluid seals comprise a ring of elastomeric material fitted within a groove or cavity in one of the mating parallel surfaces to provide a seal between the two surfaces. Because of the compliant nature of elastomers, elastomeric rings fitted into grooves provide suitable seals where relatively low pressure differentials are involved and when used in relatively simple systems. Furthermore, because of their elasticity, elastomers generally return to their original shape when pressure thereon is relieved. However (also because of their compliant nature) as the temperature and pressure differentials increase, elastomeric materials tend to be extruded and "creep" between the mating parallel surfaces, resulting in premature failure of the sealing engagement between the elastomer and the mating parallel surfaces because of nibbling or chewing wear on the extruded elastomer. Furthermore, under extremely high temperatures and at high pressure differentials, elastomeric seals which are grossly deformed thereby often tend to be "compression-set" in permanently deformed shapes, thus reducing the effectiveness of the elastomer as a sealing device.

Background Art

Efforts to minimize or eliminate extrusion nibbling have generally centered on the use of back-up rings or anti-extrusion devices incorporated into the groove to prevent the elastomeric seals from being extruded between the moving members. Generally, such back-up rings or anti-extrusion devices comprise a ring of resilient material incorporated in the groove containing the elastomeric material. The back-up ring is ordinarily a resilient material which is more rigid than the elastomeric material but which is not sufficiently elastic to be subject to "creep." Accordingly, the back-up ring is sufficiently rigid to span across the clearance between the moving surfaces and reduce extrusion of the elastomeric material but is not sufficiently elastic to form an effective seal by itself. Typical of such back-up ring devices is the sealing arrangement disclosed by U.S. Pat. No. 3,455,566 to John W. Hull, et al. In the Hull, et al arrangement a back-up ring which is triangular in cross-section is fitted within a groove containing an O-ring which is circular in cross-section. The O-ring is a conventional elastomeric material and the back-up ring is a semi-rigid material such as polytetrafluoroethylene adapted to span the gap between the relatively moving surfaces and prevent extrusion of the elastomer thereinto when pressure is applied to the elastomer. Similarly, U.S. Pat. No. 3,771,801 to John A. Burke discloses a combination elastomeric sealing ring and back-up ring disposed in a common groove with the more rigid back-up ring disposed on the low pressure side of the elastomeric sealing ring in an attempt to control or minimize extrusion of the elastomeric sealing material.

The use of back-up rings as anti-extrusion devices has met with limited success in some applications. However, the back-up ring arrangements heretofore available have not sufficiently reduced the extrusion nibbling problem in high pressure systems, in environments such as those found in high performance aircraft, missiles and the like, primarily because such prior art arrangements only limit gross extrusion but do little or nothing to control deformation of the elastomeric material directly at the point where the elastomeric material sealingly contacts the surface that is moving with respect thereto. For example, in Hull, et al the circular cross-section elastomeric material must be grossly deformed to mate with the straight leg side of the triangular anti-extrusion ring. Similarly, in Burke the outer periphery of the sealing ring extends radially past the outer periphery of the back-up ring, thus permitting gross deformation of the sealing ring before the back-up ring is deformed. In these arrangements, nibbling of the sealing ring is prevented only after gross deformation thereof but no provision is made to prevent the initial onset of extrusion or nibbling which occurs as a result thereof.

DISCLOSURE OF THE INVENTION

In accordance with the present invention, a sealing arrangement is provided which comprises a pair of rings fitted within the same groove in one of the mating surfaces of two members having mating parallel surfaces, one of which members is movable with respect to the other. The outer surfaces of both rings lie in substantially the same plane parallel with and contacting the mating surface of the other member. One of the rings is an elastomeric material and the other ring is a resilient non-elastomeric pliable material which is more rigid than the elastomeric material, and is substantially a right trapezoid in cross-section, with its longer base constituting the surface which contacts the mating surface of the other member. Preferably, each ring is substantially a right trapezoid in cross-section with one leg of each of the two trapezoids being of equal length and adjacent.

Further with respect to the preferred embodiment, the longer base of the elastomeric trapezoid is adjacent the base of the groove in one member, thus the shorter base of the elastomeric trapezoid and the longer base of the back-up ring contact the mating surface of the other member, and the elastomeric ring is positioned nearer the higher pressure fluid. Since the outer surfaces (the longer base of the back-up ring and the shorter base of the elastomeric ring) lie in the same plane and contact the surface of the mating member, any tendency toward deformation of the elastomeric ring toward the area of lower fluid pressure wedges the elastomeric ring under the back-up ring and simultaneously causes generally radial expansion of the back-up ring, in the case of a piston seal, and radial contraction in the case of a rod seal. Thus, the vector forces tending to cause extrusion of the elastomeric material act directly on the back-up ring, causing the back-up ring to radially expand or contract, for piston or rod seals, respectively, and prevent extrusion of the elastomeric material. Since the diagonal sides of the trapezoids of both rings are adjacent at the point where they contact the mating surface of the other member, any deformation of the sealing ring toward the area of lower pressure causes an immediate deformation of the back-up ring to prevent extrusion. Accordingly, extrusion nibbling of the elastomeric ring is prevented, regardless of pressure differentials encountered. By preventing any gross deformation of the sealing ring, the life of the elastomeric ring is vastly improved. Not only is extrusion nibbling prevented, but compression-set deformation, which often occurs in elastomers subjected to gross deformation at high temperatures and pressure, is reduced. Thus, the sealing assembly of the invention provides an extremely reliable and long lasting seal even when utilized in extremely harsh environments. Other advantages and features of the invention will become more readily understood from the following detailed description taken in connection with the appended claims and attached drawing.

BRIEF DESCRIPTION OF THE DRAWING

The details of the invention will be described in connection with the accompanying drawing in which the sole FIGURE is a partial sectional view of a piston and cylinder assembly employing two embodiments of the sealing arrangement of the invention.

BEST MODE FOR CARRYING OUT THE INVENTION

In the embodiments illustrated in the drawing, the sealing arrangement of the invention is utilized to provide a moving seal between a piston and the walls of a cylinder and also to provide a seal between the end wall of the cylinder and a piston rod reciprocally movable therethrough. It will be readily recognized, however, that the embodiments shown and described are intended to be illustrative of the principles of the invention and that such principles are adaptable to various other similar arrangements.

As illustrated in the drawing, a piston 25 is adapted for reciprocal movement within a cylinder 10. The circumferential outer surface of the piston 25 thus is parallel with and mates with the inner wall surfaces of the cylinder 10 to provide a second member (the piston) movable with respect to a first member (the cylinder wall). For purposes of illustration, the area enclosed by the cylinder 10 and the piston 25 is described herein as containing a fluid at a first pressure P1 which is greater than a second pressure P2 representing the fluid pressure outside the area defined by the piston 25 and the cylinder walls.

An annular circumferential groove 26 is provided in the surface of the piston 25 mating with the walls of cylinder 10, and the sealing device, comprising rings 20 and 21, is fitted therein. Ring 20 is an elastomeric ring which is a right trapezoid in cross-section. The longer base 33 of the trapezoid is disposed adjacent the base of the groove 26 with the shorter base 30 contacting the wall of cylinder 10. Ring 21 is a resilient non-elastomeric back-up ring which is more rigid than ring 20. Back-up ring 21 is also a right trapezoid in cross-section but is in reverse orientation to the trapezoid of ring 20. Thus the shorter base 41 is disposed adjacent the base of groove 26 with the longer base 43 contacting the wall of cylinder 10. The longer leg 44 of the trapezoidal back-up ring 21 mates with the longer leg 34 of the sealing ring 20 and sealing ring 20 is disposed nearer the area P1 of higher pressure. It will thus be observed that the outer peripheral face of the sealing ring 20 (represented by shorter base 30) and the outer peripheral face of the back-up ring 21 (represented by longer base 43) lie in substantially the same plane parallel with and contacting the wall of cylinder 10, and that the sealing ring 20 is wholly confined by the groove 26, the wall of cylinder 10 and the mating face of the back-up ring (represented by longer leg 44). Thus, as pressure in area P1 increases, any force having a tendency to deform sealing ring 20 toward the area of lower pressure P2 is transferred directly to the mating surface (longer leg 44) of the back-up ring 21, and sealing ring 20 therefore acts as a wedge to radially expand the back-up ring 21. Since the vector forces tending to deform the sealing ring 20 are applied to the wedge-shaped face of the back-up ring 21, any tendency to extrude the sealing ring 20 between the back-up ring 21 and the cylinder wall is prevented and gross deformation of the sealing ring 20 is prevented. Furthermore, since sealing ring 20 is wholly confined, any deformation thereof only acts to increase the sealing relationship between the ring 20 and the walls of the cylinder. Since extrusion of the sealing ring 20 is prevented, extrusion nibbling cannot occur. Likewise, since there can be no gross deformation of the sealing ring 20, the danger of compression-set deformation is reduced. Thus, the sealing arrangement provides a highly reliable long-lasting movable seal which is not subject to extrusion nibbling wear or compression-set deformation.

In the embodiment described above, the sealing ring arrangement is carried in a groove 26 on a moving piston. Thus the seal is provided by the external surface of the sealing arrangement. It will be readily recognized, however, that the principles of the invention are equally applicable to sealing arrangements wherein the seal is provided by the internal faces of a sealing ring arrangement, such as where a shaft or the like passes through a wall separating two areas containing fluids at different pressures. For internal diameter seals, the geometry of the paired rings is reversed. For example, as shown in the drawing, when a shaft or the like such as piston rod 11 passes through the end wall of cylinder 10, a seal must be provided between the external surface of the piston rod 11 and the cylinder end wall. However, the relationship of the rings 20 and 21 with respect to the mating surfaces of the two members movable with respect to each other and with respect to the two areas containing fluids at different pressures is preserved. The elastomeric sealing ring 20 and back-up ring 21 are contained in an annular groove 27 in the face of the aperture in the end wall of the cylinder 10. As described above, the sealing ring 20 is disposed toward the area of higher pressure P1 with its longer base 33 adjacent the base of the groove 27. The shorter base 30 (in this case the internal diameter edge of the sealing ring 20) is parallel with and in contact with the surface of the piston rod 11. The relationship between the two rings 20 and 21 and the mating surfaces, as well as their relationship to the pressure differential, is the same as described hereinabove. Therefore, the sealing effect and results obtained are the same as described with respect to external diameter seals.

In the embodiments illustrated, the rings 20 and 21 are complementary right trapezoids in cross-section with their longer legs in mating relationship. Thus, the shorter legs 32 and 42, respectively, are parallel and confined within the side walls of the grooves 26 and 27, leg 32 being preferably spaced slightly from the adjacent sidewalls, as shown in the drawing, to accommodate potential expansion of the rings 20, 21 from absorption of hydraulic fluid and/or slight deformation under very high pressures. It will be appreciated, however, that the relationships of the shorter legs 32 and 42 of the trapezoidal shapes are not critical to the invention. Where the groove 26 or 27 has side walls which are not parallel, it is only necessary that the leg faces 32 and 42 of the rings 20 and 21 substantially conform to the walls of the groove. Thus, if the walls of the groove are curved or stepped in cross-section, or are actually longer than legs 34 and 44, the shorter legs of the trapezoidal cross-sectional shape of the rings need only substantially conform to the shape of the groove. For purposes of this invention, however, such shapes may still be treated as right trapezoids.

The material composition of sealing ring 20 may, of course, vary with its intended use. Any elastomeric material, either natural or synthetic, conventionally used for sealing rings in the anticipated environment may be used in the physical configurations of the invention. Accordingly, the sealing ring may be made from any of a variety of elastomeric materials such as polymeric plastic nitrile rubbers, fluorinated elastomers, etc. Likewise, the material composition of the back-up ring may be any suitable pliable non-elastomeric material which is more rigid than the elastomeric material with which it is used. The back-up ring 21 should be a semi-rigid low-friction material which is wear-resistant, such as nylon, polytetrafluoroethylene and the like. Various such suitable materials are well known in the art.

From the foregoing it will be observed that the unique geometric interrelationship and orientation of the back-up ring and sealing ring combination of the invention provide a highly effective wear-resistant and reliable sealing arrangement between two mating surfaces which are movable with respect to each other. It will be appreciated that the principles of the invention, however, are not limited to reciprocally movable members or mating member surfaces which are cylindrical. The sealing arrangement may, of course, be applied with equal effectiveness to other sealing arrangements such as rotating shafts, etc. Therefore, while the invention has been described with particular reference to specific embodiments thereof, it is to be understood that the forms of the invention shown and described in detail are to be taken as preferred embodiments thereof. Various changes and modifications may be resorted to without departing from the spirit and scope of the invention as defined by the appended claims.

I claim:

1. Apparatus for forming a fluid seal between mating surfaces of first and second members movable with respect to each other wherein said second member separates a first area containing a fluid at a first pressure and a second area containing a fluid at a second, lower pressure, said second member having a recess formed therein, said recess having a bottom wall and a side wall extending substantially perpendicularly from said bottom wall and forming a substantially right angle therewith, said apparatus comprising:
    (a) an elastomeric sealing device contained within said recess in one of said mating surfaces and contacting the other of said mating surfaces;
    (b) a resilient anti-extrusion device which is more rigid than said sealing device and which is substantially a right trapezoid in cross-section contained within said recess, the longer leg thereof confronting said elastomeric sealing device, the longer base thereof contacting said other of said mating surfaces, the shorter leg thereof confronting said recess sidewall, the shorter base thereof confronting said recess bottom wall, the right angle formed between said shorter base and said shorter leg mating with the substantially right angle formed between said recess sidewall and bottom wall;
    (c) Wherein said elastomeric sealing device is disposed between said resilient anti-extrusion device and said first area.

2. Apparatus as defined in claim 1 wherein said elastomeric sealing device and said resilient anti-extrusion device are rings which are complementary right trapezoids in cross-section.

3. Apparatus for forming a fluid seal between mating surfaces of first and second members movable with respect to each other, wherein said second member separates a first area containing a fluid at a first pressure and a second area containing a fluid at a second, lower pressure, one of said members having a recess formed therein in its respective mating surface, said recess having a bottom wall and a side wall extending substantially perpendicularly from said bottom wall and forming a substantially right angle therewith, said apparatus comprising:
    (a) an elastomeric sealing device adapted to be contained within the recess and contacting the other of the mating surfaces;
    (b) a resilient, anti-extrusion device, of substantially right trapezoidal cross-sectional configuration and which is more rigid than the sealing device, contained within the recess, the longer leg of the anti-extrusion device confronting the elastomeric sealing device and the longer base of the anti-extrusion device contacting the other of the mating surfaces, the elastomeric sealing device being disposed between the resilient, anti-extrusion device and the first area, the second area having fluid communication with the shorter leg of the anti-extrusion device.

4. The apparatus of claim 3, wherein the recess is an annular groove of substantially rectangular cross-section having mutually confronting sidewalls and a bottom wall, the anti-extrusion device being adapted to seat, within the recess, with its shorter leg confronting one of the sidewalls and its shorter base confronting the bottom wall of the recess.

5. An actuator, comprising:
structure defining a cylinder;
a piston structure movably mounted within the cylinder, the piston and cylinder having mating surfaces movable with respect to each other and separating a first area containing fluid at a first pressure from a second area containing fluid at a second, lower pressure, one of the surfaces having a recess formed therein;
an elastomeric sealing device contained within the recess and contacting the other of the mating surfaces;
a resilient, pliable, anti-extrusion device of substantially right trapezoidal cross-sectional configuration, which is more rigid than the sealing device, contained within the recess, the longer leg of the anti-extrusion device confronting the elastomeric sealing device and the longer base of the anti-extrusion device contacting the other of the mating surfaces, the elastomeric sealing device being disposed between the anti-extrusion device and the first area.

6. The apparatus of claim 5, wherein the elastomeric sealing device is of right triangular trapezoidal configuration having its longer leg mating with the longer leg of the resilient anti-extrusion device.

* * * * *